(No Model.) 3 Sheets—Sheet 1.

R. JOHNSON.
BAND CUTTER AND FEEDER.

No. 541,236. Patented June 18, 1895.

Witnesses:
J. S. Clark
E. Behel.

Inventor:
Richard Johnson.
By A. J. Behel
Atts.

(No Model.) 3 Sheets—Sheet 2.

R. JOHNSON.
BAND CUTTER AND FEEDER.

No. 541,236. Patented June 18, 1895.

Witnesses:
J. S. Clark
E. Behel

Inventor:
Richard Johnson.
By A. O. Behel
Attÿ

(No Model.)  R. JOHNSON.  3 Sheets—Sheet 3.
BAND CUTTER AND FEEDER.

No. 541,236.  Patented June 18, 1895.

Witnesses:
J. S. Clark
E. Behel

Inventor:
Richard Johnson
By A. O. Behel
Atty.

United States Patent Office.

RICHARD JOHNSON, OF FREEPORT, ILLINOIS.

BAND-CUTTER AND FEEDER.

SPECIFICATION forming part of Letters Patent No. 541,236, dated June 18, 1895.

Application filed October 20, 1894. Serial No. 526,464. (No model.)

*To all whom it may concern:*

Be it known that I, RICHARD JOHNSON, a citizen of the United States, residing at Freeport, in the county of Winnebago and State of Illinois, have invented certain new and useful Improvements in Self-Feeders and Band-Cutters for Thrashing-Machines, of which the following is a specification.

The object of this invention is to construct a combined self feeder and band cutter for thrashing machines, and consists in an adjustable rotary cutter, a rotary feeding cylinder; fingers or prongs having a pivotal connection with the movable tables and a connection with a stationary support.

Figure 1:
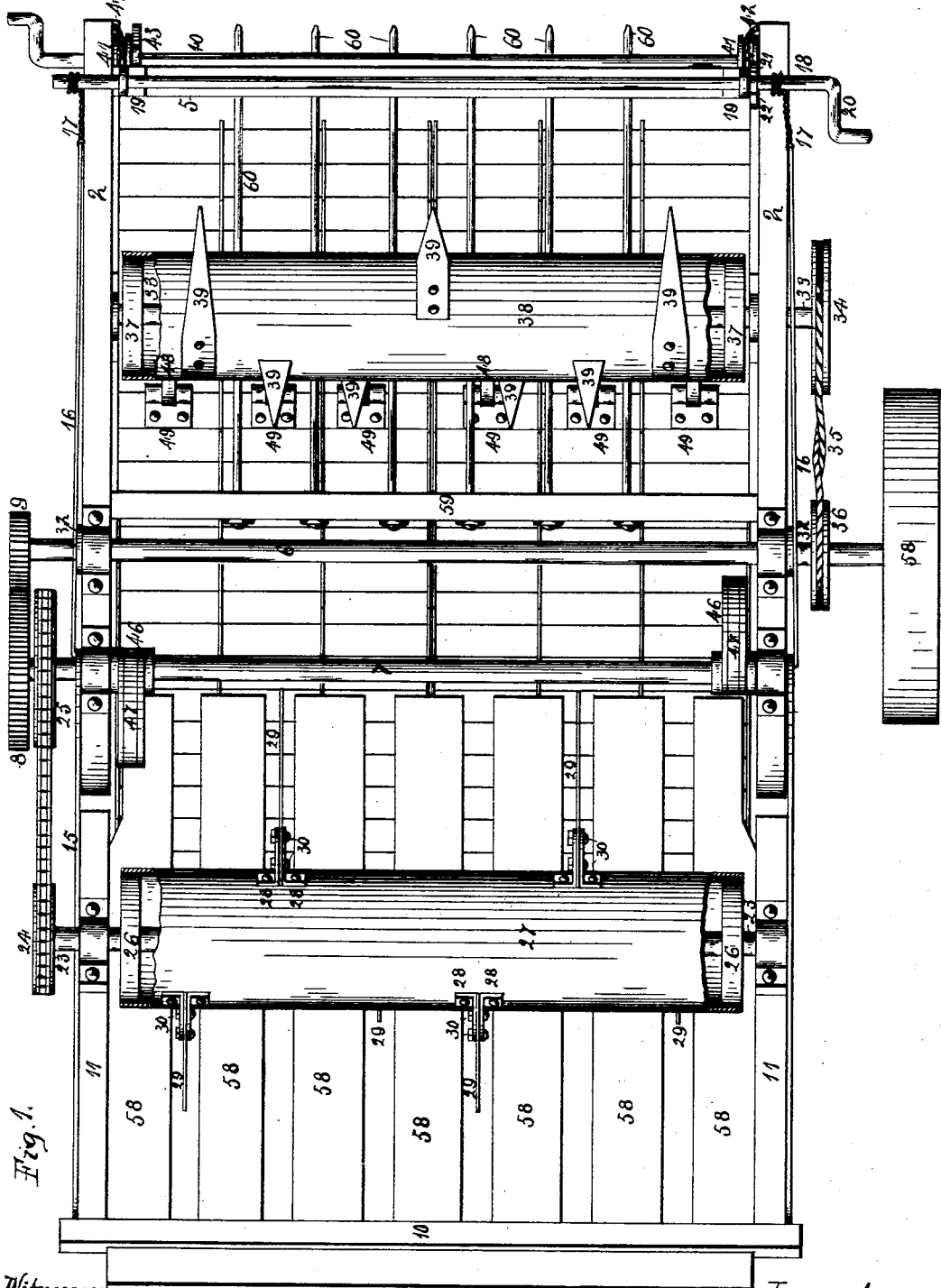
Figure 2:
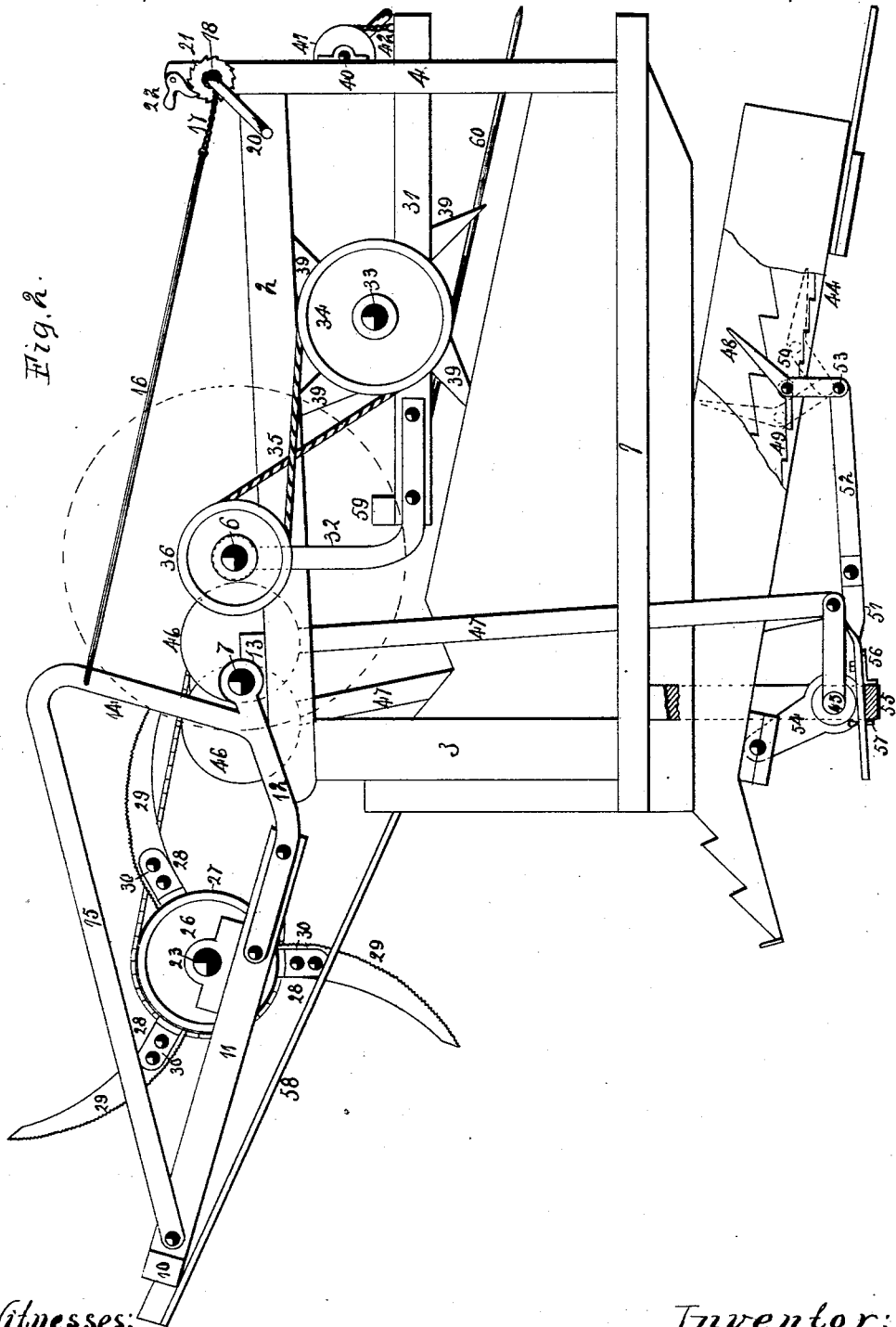
Figure 3:
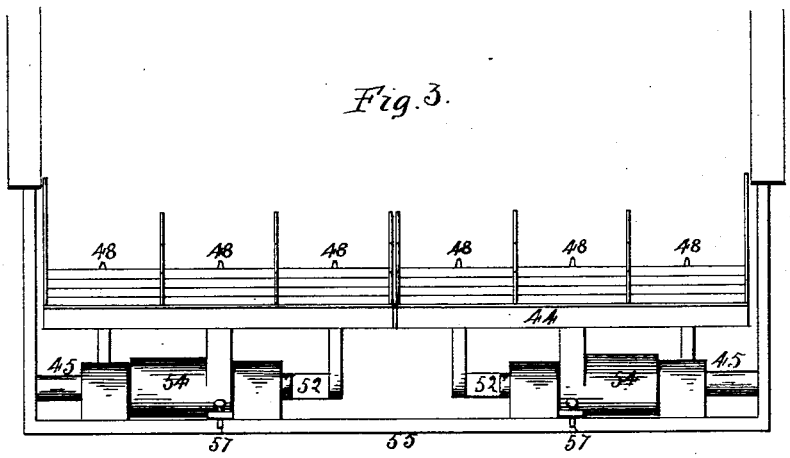
Figure 4:
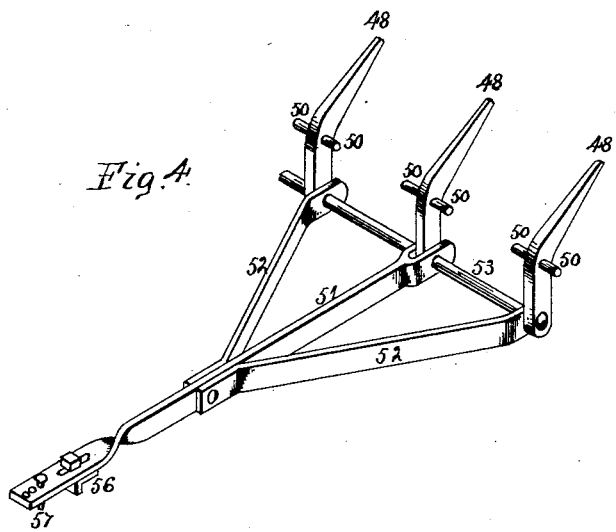

In the accompanying drawings, Figure 1 is a plan view of a self-feeder and band-cutter embodying my invention. Fig. 2 is a side elevation of the same, in which the driving-pulley has been removed and portions broken away to more clearly show the parts. Fig. 3 is a partial rear elevation. Fig. 4 is an isometrical representation of one set of fingers or prongs operated by the movement of the table.

The supporting frame is of the ordinary construction and is made up of end frames consisting of base bars 1, and top bars 2, connected by vertical bars 3, and 4, and the end frames connected at their front ends by a cross bar 5. To the upper face of the top bars is located a main driving shaft 6, held in place by suitable boxes, and to the rear of this shaft is located a second shaft 7, held in position by boxes. These two shafts are connected through the medium of the spur gears 8 and 9.

The frame for supporting the rotary cutter consists of the end bar 10, to which are connected side bars 11, and to the side bars are secured metallic bars 12, terminating in an eye 13, surrounding the shaft 7, thus forming a pivotal connection between the frame and shaft. These metallic bars have an upper extension 14, and a diagonal brace 15, and to the upward extensions are connected rods 16, leading toward the front end of the machine and to their front ends are connected chains 17, which have a connection with a shaft 18, held in bearings 19, secured to the upper face of the cross bar 5, the end of the shaft being bent to form a crank 20. A ratchet wheel 21, is secured to the shaft, and a dog 22, prevents its rotation.

A shaft 23, is held in place in connection with the side bars 11, by suitable boxes, and has a sprocket wheel 24, secured to one end which has a chain belt connection with a sprocket wheel 25, secured to the shaft 7, the center upon which the cutter frame is pivoted. To this shaft 23, are secured heads 26, just inside of the frame work, and a sheet metal drum 27, is secured to the heads. To this drum are secured angle irons 28, located in pairs leaving a space between their upturned portions. A knife 29, is located between each pair of arms and is held in place by bolts 30. These knives are located around the drum in this instance in three series and two in each series.

The frame for supporting a rotary feeder consists of the side bars 31, having metallic bars 32, secured thereto and extending upwardly having their ends perforated and surrounding the main driving shaft 6, forming a pivotal connection therewith. To the upper face of the side bars 31, are secured boxes which support a shaft 33, and a grooved faced pulley 34, is secured to one end of the shaft. A belt 35, connects this pulley 34, with a pulley 36, secured to the main driving shaft, the belt being crossed to change the direction of rotation of the shaft 33. To this shaft 33, are secured heads 37, and a sheet metal drum 38, is held in place by the heads. To the outer face of this drum are secured arms 39, which extend radially therefrom and are located in four series and two in each series.

A shaft 40, extends across the front end of the supporting frame and supports grooved faced sheaves 41. A chain 42, connected to the front ends of the side bars is connected to the sheaves. A ratchet wheel and dog 43, prevent the rotation of the shaft, and the end of the shaft is bent to form a crank by which the shaft may be rotated.

The movable tables 44, are supported in the usual manner at their front ends by the rear end of the thrashing machine, and their rear ends have a crank connection with the shafts 45, which in turn are connected to the eccentric 46, by the links 47, so that the rotation of the shaft 7, will rotate the eccentrics and the eccentrics will impart a reciprocating movement to the links which will oscillate the cranks, imparting a back and forth movement to the tables and also an up and down movement to their rear ends. To the upper faces of the tables near their front ends are pivotally secured a series of fingers or prongs 48, by the brackets 49, overlying the studs 50, extending from the center portion of the fingers. The lower portions of the fingers extend through openings in the bottom of the table.

At Fig. 4, are shown the fingers and the connections for operating them. A central bar 51, has connected to it two side bars 52, all of which have their ends perforated, and a pin 53, passing through each of the fingers and arms forms a pivotal connection between the parts. The rear end of the center bar 51, is given a quarter twist and the horizontal portion lies between the under face of the crank 54, and the upper face of the bar 55, forming a support for the cranks, and a bracket 56, secured to the under face of the bar 51, rests against the front face of the support for the crank, and a pin 57, passing through the bar resting against the rear face of the crank support holds the bars connected to the fingers from endwise movement, but capable of a limited vertically rocking movement.

The pulley 58, is connected to the motive power or to some part to which a rotary motion is imparted. The rotation of this shaft will by reason of its gear connection with the shaft 7, rotate said shaft, and the chain belt connection between this shaft 7, and the shaft 23, will rotate the knives or cutters, and the rotation of the shaft 7, will cause the tables to be reciprocated and their rear ends moved vertically through the eccentric link and crank connection.

The main shaft through the belt connection will impart a rotary movement to the feeding cylinder.

The rotary knives can be adjusted vertically by means of the crank 20, and the feeding cylinder can also be vertically adjusted by the shaft 40.

When the tables are in their extreme forward position, that portion of the fingers extending above the face of the tables will lie in contact with the upper face of the table, and when the tables are moved to their rearward position the fingers will stand at right angles to the upper face of the tables, the action of the fingers being to raise and loosen the straw and hold the straw of one table back while the straw of the other tables is being discharged, and the fingers will lie in contact with the table in order not to impede the passage of the straw.

Should the front end of the tables be vertically adjusted to meet the requirements of the different makes of thrashing machines, such adjustment would prevent the fingers from performing their duty in the manner described, unless they are properly adjusted, which is accomplished by moving the central bar in its lengthwise direction, and the bar is lengthwise slotted to permit of the adjustment of the bracket 56, and provided with a series of holes permitting the adjustment of the pin 57.

By attaching the knives in the manner described any one knife can be used and replaced without disturbing the others.

To the end bar of the knife supporting frame are secured slats 58, which pass beneath the cutters and serve to clear the cutters of the straw, and to the bar 59, connected to the side bars of the feeding cylinder are secured rods 60, between which the arms of the cylinder pass and prevent the straw from winding upon the cylinder.

I claim as my invention—

1. The combination of a supporting frame, a table having a lengthwise movement, a finger or fingers having a pivotal connection with the upper face of the table, and provided with an extension depending through an opening in the table, a link having a pivotal connection at one end with the extension and its other end connected to a stationary support.

2. The combination of a supporting frame, a table having a lengthwise movement, a series of fingers each having a pivotal connection with the table midway of their length, their lower ends connected by a cross bar, and a link connecting the cross bar with a stationary support.

RICHARD JOHNSON.

Witnesses:
A. O. BEHEL,
E. BEHEL.